US012811651B2

(12) United States Patent
Li

(10) Patent No.: US 12,811,651 B2
(45) Date of Patent: Nov. 24, 2026

(54) METHOD, APPARATUS AND DEVICE FOR REPORTING INFORMATION, METHOD, APPARATUS AND DEVICE FOR RECEIVING INFORMATION, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 259 days.

(21) Appl. No.: 18/728,060

(22) PCT Filed: Jan. 13, 2022

(86) PCT No.: PCT/CN2022/071847

§ 371 (c)(1),
(2) Date: Jul. 10, 2024

(87) PCT Pub. No.: WO2023/133763

PCT Pub. Date: Jul. 20, 2023

(65) Prior Publication Data

US 2026/0189279 A1 Jul. 2, 2026

(51) Int. Cl.

| | |
|---|---|
| ***H04B 7/06*** | (2006.01) |
| ***H04W 24/10*** | (2009.01) |
| ***H04W 72/0446*** | (2023.01) |

(52) U.S. Cl.

CPC .......... *H04B 7/0626* (2013.01); *H04W 24/10* (2013.01); *H04W 72/0446* (2013.01)

(58) Field of Classification Search

None

See application file for complete search history.

(56) References Cited

U.S. PATENT DOCUMENTS

2022/0286176 A1* 9/2022 Grossmann .......... H04B 7/0626
2023/0276457 A1* 8/2023 Wang .................. H04L 27/2602 370/329
2024/0244449 A1* 7/2024 Zhao ..................... H04W 16/28

FOREIGN PATENT DOCUMENTS

| | | | |
|---|---|---|---|
| CN | 109151887 A | | 1/2019 |
| CN | 113517965 A | | 10/2021 |
| WO | WO 2021102952 A1 | | 6/2021 |
| WO | WO 2021102954 A1 | | 6/2021 |

OTHER PUBLICATIONS

PCT/CN2022/071847 International Search Report dated Sep. 27, 2022, 2 pages.

Huawei et al. "Technical Categorization for CSI enhancements MTRP and FR1 FDD reciprocity_V25_FL" 3GPP TSG RAN WG1 Meeting #102-e, R1-2007268, Aug. 2020, 17 pages.

(Continued)

*Primary Examiner* — Walter J Divito

(74) *Attorney, Agent, or Firm* — Cozen O'Connor

(57) ABSTRACT

A method for reporting information includes that the terminal sends channel state information to a network device, and the network device receives the channel state information sent by the terminal. The channel state information includes measurement results of at least two channel state information reference signals (CSI-RSs), and the at least two CSI-RSs correspond to different time-domain resources.

19 Claims, 2 Drawing Sheets

(56) References Cited

OTHER PUBLICATIONS

Apple Inc "On beam management for new SCSs" 3GPP TSG-RAN WG1 #104-e, R1-2101375, Jan.-Feb. 2021, 2 pages.
CCMC "3D-MIMO Feedback Framework based on Hybrid RS" 3GPP TSG-RAN WG1 #80bis, R1-152034, Apr. 2015, 6 pages.
European Patent Application No. 22919426.1, Search and Opinion dated Feb. 13, 2025, 10 pages.

* cited by examiner

METHOD, APPARATUS AND DEVICE FOR REPORTING INFORMATION, METHOD, APPARATUS AND DEVICE FOR RECEIVING INFORMATION, AND STORAGE MEDIUM

CROSS-REFERENCE TO RELATED APPLICATION

This application is a U.S. national phase application of International Application No. PCT/CN2022/071847, filed Jan. 13, 2022, the entire contents of which are incorporated herein by reference.

FIELD

The present disclosure relates to the field of mobile communication, and in particular, to a method, apparatus and device for reporting information, a method, apparatus and device for receiving information, and a storage medium.

BACKGROUND

In mobile communication network systems, a network device can provide services for a terminal, and the terminal can report measured channel state information (CSI) to the network device to report the measurement result. However, due to the long feedback period of the CSI, the CSI feedback is not accurate.

SUMMARY

According to an aspect of the present disclosure, there is provided a method for reporting information. The method is performed by a terminal and includes: sending channel state information to a network device. The channel state information includes measurement results of at least two channel state information reference signals (CSI-RSs), and the at least two CSI-RSs correspond to different time-domain resources.

According to an aspect of the present disclosure, there is provided a method for receiving information. The method is performed by a network device and includes: receiving channel state information sent by a terminal. The channel state information includes measurement results of at least two channel state information reference signals (CSI-RSs), and the at least two CSI-RSs correspond to different time-domain resources.

According to an aspect of the present disclosure, there is provided a terminal. The terminal includes: a processor; a transceiver connected to the processor; and a memory for storing executable instructions of the processor. The processor is configured to load and execute the executable instructions to implement the method for reporting information as described in the above aspect.

According to an aspect of the present disclosure, there is provided a network device. The network device includes: a processor; a transceiver connected to the processor; and a memory for storing executable instructions of the processor. The processor is configured to load and execute the executable instructions to implement the method for receiving information as described in the above aspect.

According to an aspect of the present disclosure, there is provided a non-transitory computer-readable storage medium having stored therein executable program codes that, when loaded and executed by a processor, cause the method for reporting information as described in the above aspect or the method for receiving information as described in the above aspect to be implemented.

BRIEF DESCRIPTION OF THE DRAWINGS

In order to more clearly illustrate embodiments of the present disclosure, the drawings that need to be used in the description of embodiments will be briefly introduced below. Apparently, the drawings in the following description only involve some embodiments of the present disclosure, and other drawings can be obtained by those skilled in the art according to these drawings without creative effort.

DETAILED DESCRIPTION

In order to make the purposes, technical solutions and advantages of the present disclosure clearer, embodiments of the present disclosure will be further described in detail below with reference to the accompanying drawings.

Reference will now be made in detail to illustrative embodiments, examples of which are illustrated in the accompanying drawings. The following description refers to the accompanying drawings in which the same numbers in different drawings represent the same or similar elements unless otherwise represented. The implementations described in the following illustrative embodiments do not represent all implementations consistent with the present disclosure. Instead, they are merely examples of apparatuses and methods consistent with some aspects of the present disclosure as recited in the appended claims.

Terms used in the present disclosure are only for the purpose of describing specific embodiments, but should not be construed to limit the present disclosure. As used in the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated items listed.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

In the following, application scenarios of the present disclosure are described.

Figure 1:
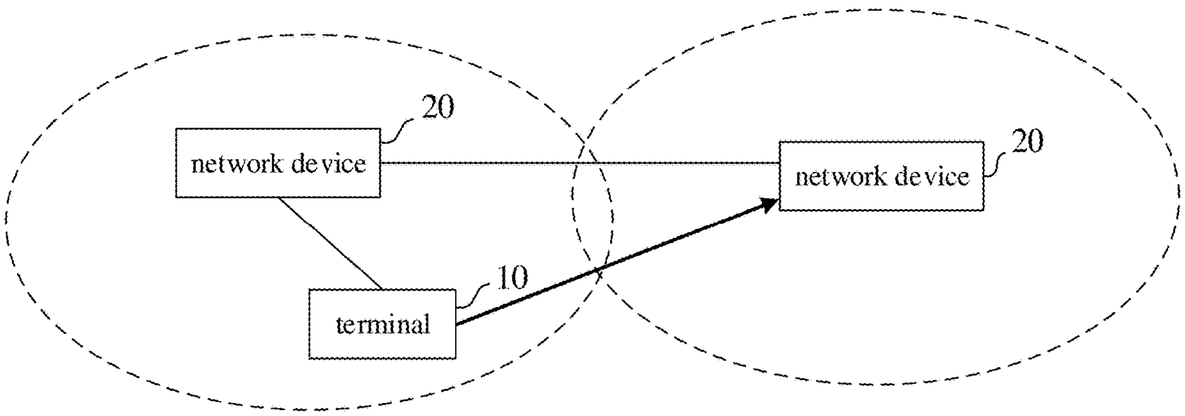
FIG. 1 shows a schematic block diagram of a communication system according to an illustrative embodiment of the present disclosure.

FIG. 1 shows a schematic block diagram of a communication system according to an illustrative embodiment of the present disclosure, the communication system may include: a terminal 10 and a network device 20.

There generally exist multiple terminals 10, and one or more terminals 10 may be distributed in a cell managed by each network device 20. The terminals 10 may include various devices with wireless communication functions, such as handheld devices, vehicle-mounted devices, wearable devices, computing devices or other processing devices connected to a radio modem, as well as various forms of user equipment (UEs), mobile stations (MSs) and so on. For convenience of description, in embodiments of the present disclosure, the above-mentioned devices are collectively referred to as terminals.

The network device 20 is a device deployed in an access network to provide a wireless communication function for the terminal 10. For the convenience of description, in embodiments of the present disclosure, the above-mentioned devices that provide the wireless communication function for the terminal 10 are collectively referred to as network devices. A connection can be established between the network device 20 and the terminal 10 through an air interface, so as to perform communications through this connection, including interactions of signaling and data. There may exist multiple network devices 20, and two adjacent network devices 20 may also communicate with each other in a wired or wireless manner. The terminal 10 can perform handover among different network devices 20. That is, the terminal 10 can establish connections with different network devices 20.

The network devices 20 may include various forms of macro base stations, micro base stations, relay stations, access points and so on. In systems using different radio access techniques, devices having the function of the network device may have different names, for example, in the 5G NR system, they are called gNodeB or gNB. With the evolution of the communication technology, the name "network device" may change.

Embodiments of the present disclosure provide a method, apparatus and device for reporting information, a method, apparatus and device for receiving information, and a storage medium, with which the feedback time is shortened, the feedback delay is reduced, and the signaling overhead is reduced. The technical solutions are as follows.

According to an aspect of the present disclosure, there is provided a method for reporting information. The method is performed by a terminal and includes: sending channel state information to a network device. The channel state information includes measurement results of at least two channel state information reference signals (CSI-RSs), and the at least two CSI-RSs correspond to different time-domain resources.

According to an aspect of the present disclosure, there is provided a method for receiving information. The method is performed by a network device and includes: receiving channel state information sent by a terminal. The channel state information includes measurement results of at least two channel state information reference signals (CSI-RSs), and the at least two CSI-RSs correspond to different time-domain resources.

According to an aspect of the present disclosure, there is provided an apparatus for reporting information. The apparatus includes a sending module. The sending module is configured to send channel state information to a network device. The channel state information includes measurement results of at least two channel state information reference signals (CSI-RSs), and the at least two CSI-RSs correspond to different time-domain resources.

According to an aspect of the present disclosure, there is provided an apparatus for receiving information. The apparatus includes a receiving module. The receiving module is configured to receive channel state information sent by a terminal. The channel state information includes measurement results of at least two channel state information reference signals (CSI-RSs), and the at least two CSI-RSs correspond to different time-domain resources.

According to an aspect of the present disclosure, there is provided a terminal. The terminal includes: a processor; a transceiver connected to the processor; and a memory for storing executable instructions of the processor. The processor is configured to load and execute the executable instructions to implement the method for reporting information as described in the above aspect.

According to an aspect of the present disclosure, there is provided a network device. The network device includes: a processor; a transceiver connected to the processor; and a memory for storing executable instructions of the processor. The processor is configured to load and execute the executable instructions to implement the method for receiving information as described in the above aspect.

According to an aspect of the present disclosure, there is provided a computer-readable storage medium having stored therein executable program codes that, when loaded and executed by a processor, cause the method for reporting information as described in the above aspect or the method for receiving information as described in the above aspect to be implemented.

According to an aspect of the present disclosure, there is provided a chip. The chip includes a programmable logic circuit and/or program instructions. The chip, when run on a terminal or a network device, causes the method for reporting information as described in the above aspect or the method for receiving information as described in the above aspect to be implemented.

According to an aspect of the present disclosure, there is provided a computer program product that, when executed by a processor of a terminal or a network device, cause the method for reporting information as described in the above aspect or the method for receiving information as described in the above aspect to be implemented.

Embodiments of the present disclosure provide a method for reporting information, in which the terminal reports the channel state information including the measurement results corresponding to at least two CSI-RSs with different time-domain resources, without need to report the measurement result of each CSI-RS separately, so that the feedback time is shortened, the feedback delay is reduced, and the signaling overhead is reduced.

Figure 2:
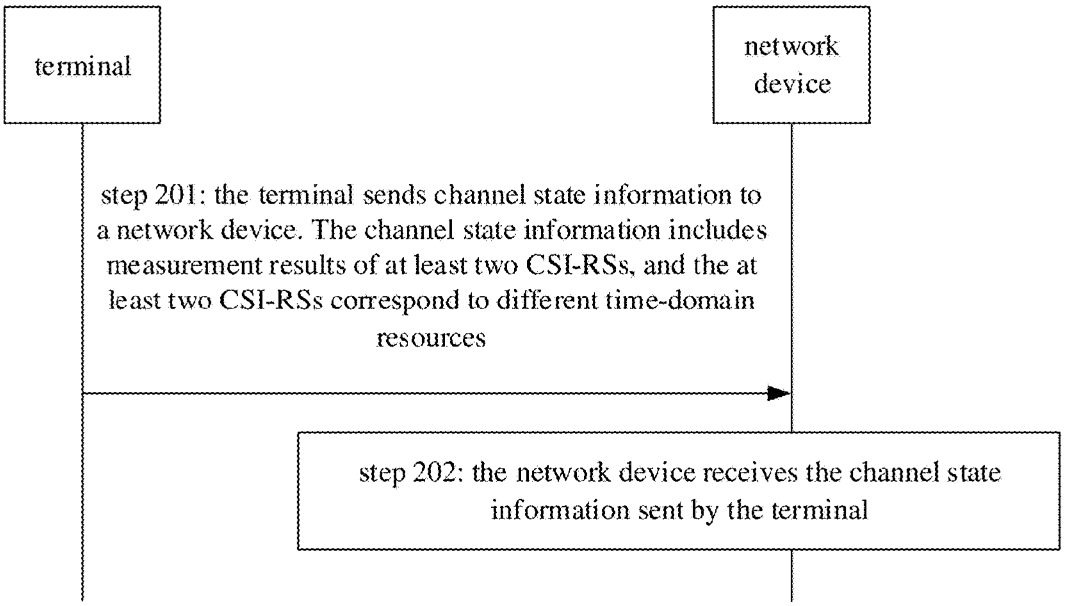
FIG. 2 shows a schematic flowchart of a method for reporting information according to an illustrative embodiment of the present disclosure.

FIG. 2 shows a schematic flowchart of a method for reporting information according to an illustrative embodiment of the present disclosure, which for example may be applied to the terminal and the network device as shown in FIG. 1, and includes at least some of the following contents.

In step 201, the terminal sends channel state information to a network device. The channel state information includes measurement results of at least two channel state information reference signals (CSI-RSs), and the at least two CSI-RSs correspond to different time-domain resources.

In embodiments of the present application, the terminal and the network device interact with each other, and the terminal will obtain the channel state information based on the at least two channel state information-reference signals (CSI-RSs) sent by the network device, and the channel state information includes the measurement results of the CSI-RSs.

The at least two CSI-RSs correspond to different time-domain resources. That is, the channel state information sent by the terminal to the network device includes the measurement results corresponding to the at least two CSI-RSs with different time-domain resources.

In step 202, the network device receives the channel state information sent by the terminal.

In embodiments of the present disclosure, the network device receives the channel state information, and determines the measurement results of the at least two CSI-RSs with different time-domain resources.

In some embodiments, the time-domain resources of the at least two CSI-RSs are different, that is, the at least two CSI-RSs satisfy at least one of:

(1) the at least two CSI-RSs corresponding to different CSI-RS resource sets;

(2) the at least two CSI-RSs corresponding to different CSI-RS resource indexes; or (3) the at least two CSI-RSs corresponding to different sending time identifiers of a same CSI-RS index.

In an embodiment, the at least two CSI-RSs correspond to different CSI-RS resource sets. For example, two CSI-RS resource sets are included, CSI-RS indexes included in one of the two CSI-RS resource sets are the same as that included in the other one of the two CSI-RS resource sets, respectively, and two CSI-RSs corresponding to the same CSI-RS index in the two CSI-RS resource sets correspond to different time-domain resources, i.e. they are sent at different times.

In another embodiment, the at least two CSI-RSs correspond to different sending time identifiers of the same CSI-RS index. For example, for a CSI-RS index, it is repeatedly sent N times at different times within a period of time, a sending time identifier corresponds to an $i^{th}$ transmission, and a value of the i is from 1 to N.

In embodiments of the present disclosure, the CSI-RS resource sets, the CSI-RS resource indexes or the sending time identifiers are used to indicate that the at least two CSI-RSs correspond to different time-domain resources, which expands the indication manners of the CSI-RSs, and the measurement result of each CSI-RS does not need to be reported separately, which shortens the feedback time, reduces the feedback delay, and reduces the signaling overhead.

In some embodiments, the channel state information-reference signal may be transmitted through multiple transmission modes, which for example include any of:

(1) periodical transmission;

(2) N times of transmissions in a period, where N is an integer greater than 0.

(3) aperiodic transmission;

(4) semi-persistent transmission.

In some embodiments, the channel state information is carried in a physical uplink control channel (PUCCH) and/or a physical uplink shared channel (PUSCH).

It should be noted that the step performed by the terminal in embodiments of the present disclosure may be implemented separately to form a new embodiment, and the step performed by the network device may be implemented separately to form a new embodiment.

In the method for reporting information according to embodiments of the present disclosure, the terminal reports the channel state information including the measurement results corresponding to at least two CSI-RSs with different time-domain resources, without need to report the measurement result of each CSI-RS separately, so that the feedback time is shortened, the feedback delay is reduced, and the signaling overhead is reduced.

On the basis of the embodiments shown in FIG. 2, the channel state information further includes a frequency-domain base vector corresponding to the time-domain resource corresponding to each of the at least two CSI-RSs.

In embodiments of the present disclosure, the terminal not only reports the measurement results of the CSI-RSs, but also needs to report the frequency-domain base vector corresponding to the time-domain resource corresponding to each of the CSI-RSs. Since the CSI-RSs correspond to different time-domain resources, that is, the CSI-RSs are sent at different time points, the terminal can report the frequency domain base vector corresponding to the time-domain resources respectively via the channel state information. A frequency-domain base vectors is also called a vector.

The frequency-domain base vector is a parameter related to a subband corresponding to a channel quality indicator (CQI) and/or a subband corresponding to a precoding matrix indicator (PMI). For example, the frequency-domain base vector is the same as the subband corresponding to the CQI, or is half of the subband corresponding to the CQI, or is 1/R, where R is an integer greater than 1.

Optionally, for the at least two CSI-RSs, the terminal reports the same frequency domain base vector, that is, the frequency domain base vectors corresponding to the time-domain resources corresponding to the at least two CSI-RSs are the same.

Optionally, for each of the at least two CSI-RSs, the terminal reports the frequency-domain base vector corresponding to the time-domain resource corresponding to the each of the at least two CSI-RSs, respectively. That is, the frequency-domain base vectors corresponding to the time-domain resources corresponding to different CSI-RSs may be the same or may be different.

In the solutions according to embodiments of the present disclosure, the terminal reports the frequency-domain base vector corresponding to the time-domain resource corresponding to each of the at least two CSI-RSs, so that the network device can obtain the frequency-domain base vector corresponding to the time-domain resource corresponding to each of the at least two CSI-RSs. In this way, the comprehensiveness of the channel state information reported by the terminal is ensured, and the transmission performance is improved.

On the basis of the embodiments shown in FIG. 2, a number of the at least two CSI-RSs is M, and the channel state information indicates a combination identifier of a combination of M CSI-RSs selected from N CSI-RSs, where N is an integer greater than 2, M is an integer greater than 1, and M is less than N.

In embodiments of the present disclosure, the network device sends N CSI-RSs to the terminal, and the terminal can measure the N CSI-RSs. When the terminal reports the channel state information, the terminal can select M CSI-RSs from the N CSI-RSs, and report a combination identifier corresponding to the selected M CSI-RSs.

In some embodiments, the N CSI-RSs include at least M CSI-RSs which correspond to different time-domain resources, that is, the N CSI-RSs correspond to M time-domain resources, and the terminal selects M time-domain resources from N time-domain resources.

In some embodiments, the channel state information indicates the at least two CSI-RSs from the N CSI-RSs via the combination identifier included therein.

For example, N=3, that is three CSI-RSs are included, which are CSI-RS #1, CSI-RS #2, and CSI-RS #3, respectively, and the time-domain resources corresponding to these three CSI-RSs are different from each other. M=2, that is, 2 CSI-RSs are selected from the 3 CSI-RSs. In this case, there are three combinations as follows:

combination 1: CSI-RS #1, CSI-RS #2;
combination 2: CSI-RS #1, CSI-RS #3;
combination 3: CSI-RS #2, CSI-RS #3.

Then, 2 bits are needed to indicate combination identifiers corresponding to respective combinations, for example, 00 indicates the combination 1, 01 indicates the combination 2, and 10 indicates the combination 3.

That is, the number of bits required for the combination identifiers is determined by taking the logarithm on the number of combinations with 2 as the bottom number, and then rounding up. A value of the bits indicates a combination identifier, and then it is determined according to the combination identifier which M CSI-RSs from the N CSI-RSs correspond to the combination identifier.

Optionally, the value of at least one of N or M is configured by the network device.

In the solutions according to embodiments of the present disclosure, the terminal reports the at least two CSI-RSs selected from the N CSI-RSs via the channel state information, so that the network device can obtain the selection of the at least two CSI-RSs. In this way, the comprehensiveness of the channel state information reported by the terminal is ensured, and the transmission performance is improved.

On the basis of the embodiments shown in FIG. 2, the channel state information further indicates a beam corresponding to the time-domain resource corresponding to each of the at least two CSI-RSs.

In embodiments of the present disclosure, the at least two CSI-RSs correspond to different time-domain resources, and different time-domain resources may correspond to the same beam or may correspond to different beams. When reporting the channel state information, the terminal also reports the beam corresponding to the time-domain resource corresponding to each of the at least two CSI-RSs.

The beam corresponding to the time-domain resource corresponding to each of the at least two CSI-RSs is indicated by a parameter related to a number of antenna ports and/or a number of oversamplings.

The number of antenna ports is expressed as $N_1*N_2$, where $N_1$ is a number of antenna ports in a first dimension, and $N_2$ is a number of antenna ports in a second dimension. The number of oversamplings is expressed as $O_1*O_2$, where $O_1$ is a number of oversamplings in a first dimension, and $O_2$ is a number of oversamplings in a second dimension.

For example, the corresponding beam is indicated by the parameter related to the number of antenna ports and/or the number of oversamplings, and the parameter has a value range of 0 to $N_1*O_1-1$, 0 to $N_2*O_2-1$, 0 to $O_1*O_2-1$, 0 to $O_1-1$, 0 to $O_2-1$, 0 to $N_1-1$, 0 to $N_2-1$, 0 to $N_1*O_1/2-1$, 0 to $N_2*O_2/2-1$, or 0 to (a number of combinations of L antenna ports selected from $N_1*N_2$ antenna ports)−1, wherein L is an integer greater than 1.

Optionally, for the at least two CSI-RSs, the terminal reports the same beam, that is, the time-domain resources corresponding to the at least two CSI-RSs correspond to the same beam.

Optionally, for each of the at least two CSI-RSs, the terminal reports the beam corresponding to the time-domain resource corresponding to the each of the at least two CSI-RSs, respectively. That is, the beams corresponding to the time-domain resources corresponding to different CSI-RSs may be the same or may be different.

In the solutions according to embodiments of the present disclosure, the terminal reports the beam corresponding to the time-domain resource corresponding to each of the at least two CSI-RSs, so that the network device can obtain the beam corresponding to the time-domain resource corresponding to each of the at least two CSI-RSs. In this way, the comprehensiveness of the channel state information reported by the terminal is ensured, and the transmission performance is improved.

On the basis of the embodiments shown in FIG. 2, the channel state information not only indicates the beams corresponding to the time-domain resources corresponding to the at least two CSI-RSs, but also includes a first magnitude coefficient and/or a first phase coefficient of the beam corresponding to each of the at least two CSI-RSs.

In embodiments of the present disclosure, for each CSI-RS, it corresponds to a time-domain resource, and a beam corresponding to the time-domain resource corresponds to a first magnitude coefficient and/or the first phase coefficient. In the following, how to determine the first magnitude coefficient and the first phase coefficient will be described.

1. Method for Determining the First Magnitude Coefficient

In some embodiments, the first magnitude coefficient corresponding to a beam corresponding to a CSI-RS includes at least one second magnitude coefficient.

In embodiments of the present disclosure, the first magnitude coefficient indicates a magnitude of the beam corresponding to the CSI-RS, and includes at least one second magnitude coefficient, and the at least one second magnitude coefficient indicates the first magnitude coefficient.

Optionally, the first magnitude coefficient is a product of the at least one second magnitude coefficient.

In embodiments of the present disclosure, the first magnitude coefficient includes at least one second magnitude coefficient, and the product of the at least one second magnitude coefficient is determined as the first magnitude coefficient.

Optionally, the at least one second magnitude coefficient includes a wideband magnitude coefficient and/or a narrowband magnitude coefficient.

In embodiments of the present disclosure, for the at least one second magnitude coefficient, the at least one second magnitude coefficient may be the wideband magnitude coefficient or the narrowband magnitude coefficient, or include both the wideband magnitude coefficient and the narrowband magnitude coefficient.

Wideband refers to an entire bandwidth, an entire bandwidth corresponding to a cell, an entire bandwidth available to the terminal, an entire bandwidth used by the terminal, or an entire bandwidth configured for the terminal, such as a bandwidth corresponding to an activated band width part (BWP).

Narrowband refers to a subband formed by dividing the entire bandwidth into multiple subbands. For example, for a bandwidth having physical resource blocks (PRBs) numbered from 24 to 72, a subband has 4 PRBs or 8 PRBs; for a bandwidth having PRBs numbered from 73 to 144, a subband has 8 PRBs or 16 PRBs; for a bandwidth having PRBs numbered from 145 to 275, a subband has 16 PRBs or 32 PRBs. Further, a subband may be divided into multiple frequency-domain units or frequency-domain base vectors. Alternatively, the narrowband is the frequency-domain unit or the frequency-domain base vector.

Optionally, the at least one second magnitude coefficient includes at least one of: a time point reference magnitude, a polarization reference magnitude, or a frequency-domain base vector magnitude.

In embodiments of the present disclosure, for each CSI-RS, its corresponding time-domain resource includes multiple polarization directions, and the time point reference magnitude is the same for each of the multiple polarization directions. The polarization reference magnitude is the same for all frequency-domain base vectors in a polarization direction. However, the frequency-domain base vector magnitude is independent for the multiple frequency-domain base vectors corresponding to the time-domain resource.

It should be noted that the channel state information in embodiments of the present disclosure includes information corresponding to the at least two CSI-RSs, and each CSI-RS corresponds to a time-domain resource. The one of the at least two CSI-RSs which corresponds to a maximum magnitude value in terms of the time point reference magnitude is indicated first, and the maximum magnitude value is quantized as 1. For the time point reference magnitudes of other CSI-RSs, they are represented by different values relative to the maximum magnitude value.

The channel state information also includes a position of the time-domain resource corresponding to the maximum time point reference magnitude, so as to indicate which time-domain resource corresponds to the maximum time point reference magnitude.

Optionally, the maximum time point reference magnitude is 1, and other time point reference magnitudes relative to the maximum time point reference magnitude are all less than 1.

For example, the channel state information includes information corresponding to three CSI-RSs, which are a first CSI-RS, a second CSI-RS and a third CSI-RS, and the time point reference magnitude corresponding to the second CSI-RS is maximum, so the time point reference magnitude corresponding to the first CSI-RS is a sum or a product of the time point reference magnitude corresponding to the second CSI-RS and a different value of the first CSI-RS, and the time point reference magnitude corresponding to the third CSI-RS is a sum or a product of the time point reference magnitude corresponding to the second CSI-RS and a different value of the third CSI-RS.

In some other embodiments, for the time-domain resources corresponding to the at least two CSI-RSs, there exists a time-domain resource which corresponds to the maximum time point reference magnitude, and the time-domain resource corresponds to multiple polarization directions. For one of the multiple polarization directions, its corresponding polarization reference magnitude is 1, and the frequency-domain base vector magnitudes corresponding to this polarization direction all are represented by difference values relative to the polarization reference magnitude. For each of other polarization directions, a polarization reference magnitude is assigned to this polarization direction, and the frequency-domain base vector magnitudes corresponding to this polarization direction all are represented by difference values relative to the assigned polarization reference magnitude.

That is to say, in a polarization direction, for each frequency-domain base vector magnitude, the frequency-domain base vector magnitude is a sum or a product of the polarization reference magnitude and a difference value corresponding to the frequency-domain base vector magnitude.

In addition, for other time-domain resources whose corresponding time point reference magnitudes are not the maximum time point reference magnitude, each of these time-domain resources also corresponds to multiple polarization directions, a polarization reference magnitude is assigned to each of the multiple polarization directions, and the frequency-domain base vector magnitudes corresponding to this polarization direction are represented by difference values relative to the polarization reference magnitude corresponding to this polarization direction.

2. Method for Determining the First Phase Coefficient

In some embodiments, the first phase coefficient of a beam corresponding to a CSI-RS includes at least one second phase coefficient.

In embodiments of the present disclosure, the first phase coefficient indicates a phase corresponding to the beam corresponding to the CSI-RS, and includes at least one second phase coefficient, and the at least one second phase coefficient indicates the first magnitude coefficient.

Optionally, the first phase coefficient is a product of the at least one second phase coefficient.

In embodiments of the present disclosure, the first phase coefficient includes the at least one second phase coefficient, and the product of the at least one second phase coefficient is determined as the first phase coefficient.

Optionally, the at least one second phase coefficient includes a wideband phase coefficient and/or a narrowband phase coefficient.

In embodiments of the present disclosure, for the at least one second phase coefficient, the at least one second phase coefficient may be the wideband phase coefficient or the narrowband phase coefficient, or include both the wideband phase coefficient and the narrowband phase coefficient.

Wideband refers to an entire bandwidth, an entire bandwidth corresponding to a cell, an entire bandwidth available to the terminal, an entire bandwidth used by the terminal, or an entire bandwidth configured for the terminal, such as a bandwidth corresponding to an activated BWP.

Narrowband refers to a subband formed by dividing the entire bandwidth into multiple subbands. For example, for a bandwidth having physical resource blocks (PRBs) numbered from 24 to 72, a subband has 4 PRBs or 8 PRBs; for a bandwidth having PRBs numbered from 73 to 144, a subband has 8 PRBs or 16 PRBs; for a bandwidth having PRBs numbered from 145 to 275, a subband has 16 PRBs or 32 PRBs. Further, a subband may be divided into multiple frequency-domain units or frequency-domain base vectors. Alternatively, the narrowband is the frequency-domain unit or the frequency-domain base vector.

Optionally, the at least one second phase coefficient includes at least one of: a time point reference phase, a polarization reference phase, or a frequency-domain base vector phase.

In embodiments of the present disclosure, for each CSI-RS, its corresponding time-domain resource includes multiple polarization directions, and the time point reference phase is the same for each of the multiple polarization directions. The polarization reference phase is the same for all frequency-domain base vectors in a polarization direction. However, the frequency-domain base vector phase is independent for the multiple frequency-domain base vectors corresponding to the time-domain resource.

It should be noted that the channel state information in embodiments of the present disclosure includes information corresponding to the at least two CSI-RSs, and each CSI-RS corresponds to a time-domain resource. The one of the at least two CSI-RSs which corresponds to a maximum phase value in terms of the time point reference phase is indicated first, and the maximum phase value is quantized as 0. For the time point reference phases of other CSI-RSs, they are represented by different values relative to the maximum phase value.

The channel state information also includes a position of the time-domain resource corresponding to the maximum time point reference phase, so as to indicate which time-domain resource corresponds to the maximum time point reference phase.

Optionally, the maximum time point reference phase is 0.

For example, the channel state information includes information corresponding to three CSI-RSs, which are a first CSI-RS, a second CSI-RS and a third CSI-RS, and the time point reference phase corresponding to the second CSI-RS is maximum, so the time point reference phase corresponding to the first CSI-RS is a sum or a product of the time point reference phase corresponding to the second CSI-RS and a different value of the first CSI-RS, and the time point reference phase corresponding to the third CSI-RS is a sum or a product of the time point reference phase corresponding to the second CSI-RS and a different value of the third CSI-RS.

In some other embodiments, for the time-domain resources corresponding to the at least two CSI-RSs, there exists a time-domain resource which corresponds to the maximum time point reference phase, and the time-domain resource corresponds to multiple polarization directions. For one of the multiple polarization directions, its corresponding polarization reference phase is 0, and the frequency-domain base vector phases corresponding to this polarization direction all are represented by difference values relative to the polarization reference phase. For each of other polarization directions, a polarization reference phase is assigned to this polarization direction, and the frequency-domain base vector phases corresponding to this polarization direction all are represented by difference values relative to the assigned polarization reference phase.

That is to say, in a polarization direction, for each frequency-domain base vector phase, the frequency-domain base vector phase is a sum or a product of the polarization reference phase and a difference value corresponding to the frequency-domain base vector phase.

In addition, for other time-domain resources whose corresponding time point reference phases are not the maximum time point reference phase, each of these time-domain resources also corresponds to multiple polarization directions, a polarization reference phase is assigned to each of the multiple polarization directions, and the frequency-domain base vector phases corresponding to this polarization direction are represented by difference values relative to the polarization reference phase corresponding to this polarization direction.

In solutions according to embodiments of the present disclosure, the magnitude and/or phase of the beam can be indicated through the channel state information, so that the network device can acquire the magnitude and/or phase of the beam corresponding to the time-domain resource corresponding to each CSI-RS, the comprehensiveness of the channel state information reported by the terminal is ensured, and the transmission performance is improved.

It should be noted that the above embodiments can be split into new embodiments, or combined with other embodiments to form new embodiments. The present disclosure does not limit the combination manners of various embodiments.

Figure 3:
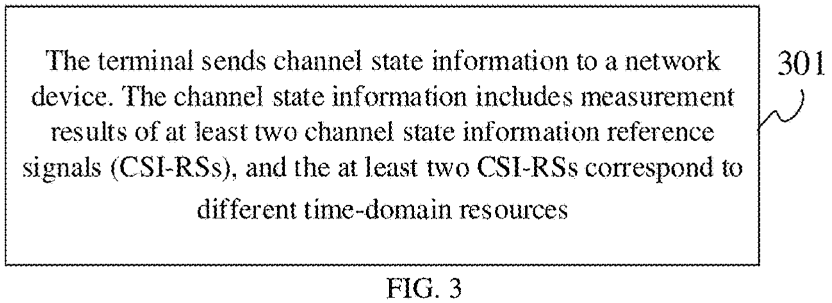
FIG. 3 shows a schematic flowchart of another method for reporting information according to an illustrative embodiment of the present disclosure.

FIG. 3 shows a schematic flowchart of another method for reporting information according to an illustrative embodiment of the present disclosure, which for example may be applied to the terminal as shown in FIG. 1, and includes at least some of the following contents.

In step 301, the terminal sends channel state information to a network device. The channel state information includes measurement results of at least two channel state information reference signals (CSI-RSs), and the at least two CSI-RSs correspond to different time-domain resources.

In some embodiments, the at least two CSI-RSs satisfy at least one of: the at least two CSI-RSs corresponding to different CSI-RS resource sets; the at least two CSI-RSs corresponding to different CSI-RS resource indexes; or the at least two CSI-RSs corresponding to different sending time identifiers of a same CSI-RS index.

The process of the step 301 is similar to that of the above step 201, and will not be repeated here.

In some embodiments, the channel state information includes a frequency-domain base vector corresponding to the time-domain resource corresponding to each of the at least two CSI-RSs.

In some other embodiments, a number of the at least two CSI-RSs is M, and the channel state information indicates a combination identifier of a combination of M CSI-RSs selected from N CSI-RSs, where N is an integer greater than 2, M is an integer greater than 1, and M is less than N.

The frequency-domain base vector and the combination identifier described in these embodiments are similar to those described in the above embodiments, and will not be repeated here.

In some embodiments, the channel state information indicates a beam corresponding to the time-domain resource corresponding to each of the at least two CSI-RSs.

Optionally, the beam corresponding to the time-domain resource corresponding to each of the at least two CSI-RSs is indicated by a parameter related to a number of antenna ports and/or a number of oversamplings.

In some embodiments, the channel state information further includes a first magnitude coefficient and/or a first phase coefficient of a beam corresponding to each of the at least two CSI-RSs.

Optionally, the first magnitude coefficient of the beam includes at least one second magnitude coefficient.

Optionally, the first magnitude coefficient is a product of the at least one second magnitude coefficient.

Optionally, the at least one second magnitude coefficient includes a wideband magnitude coefficient and/or a narrowband magnitude coefficient.

Optionally, the at least one second magnitude coefficient includes at least one of: a time point reference magnitude, a polarization reference magnitude, or a frequency-domain base vector magnitude.

In some other embodiments, the first phase coefficient of the beam includes at least one second phase coefficient.

Optionally, the first phase coefficient is a product of the at least one second phase coefficient.

Optionally, the at least one second phase coefficient includes a wideband phase coefficient and/or a narrowband phase coefficient.

Optionally, the at least one second phase coefficient includes at least one of: a time point reference phase, a polarization reference phase, or a frequency-domain base vector phase.

The beam indicated by the channel state information and the first magnitude coefficient and the first phase coefficient corresponding to the beam described in these embodiments of the present disclosure are similar to those described in the above embodiments, and will not be repeated here.

In the method for reporting information according to embodiments of the present disclosure, the terminal reports the channel state information including the measurement results corresponding to at least two CSI-RSs with different time-domain resources, without need to report the measurement result of each CSI-RS separately, so that the feedback time is shortened, the feedback delay is reduced, and the signaling overhead is reduced.

Figure 4:
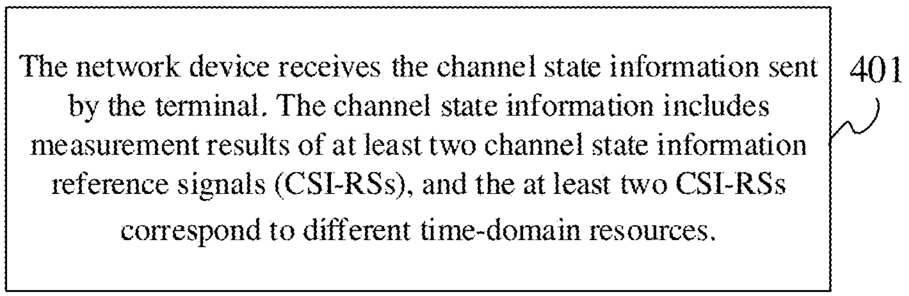
FIG. 4 shows a schematic flowchart of a method for receiving information according to an illustrative embodiment of the present disclosure.

FIG. 4 shows a schematic flowchart of a method for receiving information according to an illustrative embodiment of the present disclosure, which for example may be applied in the network device as shown in FIG. 1, and includes at least some of the following contents.

In step 401, the network device receives channel state information sent by a terminal. The channel state information includes measurement results of at least two channel state information reference signals (CSI-RSs), and the at least two CSI-RSs correspond to different time-domain resources.

In some embodiments, the at least two CSI-RSs satisfy at least one of: the at least two CSI-RSs corresponding to different CSI-RS resource sets; the at least two CSI-RSs corresponding to different CSI-RS resource indexes; or the at least two CSI-RSs corresponding to different sending time identifiers of a same CSI-RS index.

The process of the step 401 is similar to the step 202 in the above embodiments, and will not be repeated here.

In some embodiments, the channel state information includes a frequency-domain base vector corresponding to the time-domain resource corresponding to each of the at least two CSI-RSs.

In some other embodiments, a number of the at least two CSI-RSs is M, and the channel state information indicates a combination identifier of a combination of M CSI-RSs selected from the N CSI-RSs, where N is an integer greater than 2, M is an integer greater than 1, and M is less than N.

The frequency-domain base vector and the combination identifier described in these embodiments are similar to those described in the above embodiments, and will not be repeated here.

In some embodiments, the channel state information indicates a beam corresponding to the time-domain resource corresponding to each of the at least two CSI-RSs.

Optionally, the beam corresponding to the time-domain resource corresponding to each of the at least two CSI-RSs is indicated by a parameter related to a number of antenna ports and/or a number of oversamplings.

In some embodiments, the channel state information further includes a first magnitude coefficient and/or a first phase coefficient of a beam corresponding to each of the at least two CSI-RSs.

Optionally, the first magnitude coefficient of the beam includes at least one second magnitude coefficient.

Optionally, the first magnitude coefficient is a product of the at least one second magnitude coefficient.

Optionally, the at least one second magnitude coefficient includes a wideband magnitude coefficient and/or a narrowband magnitude coefficient.

Optionally, the at least one second magnitude coefficient includes at least one of: a time point reference magnitude, a polarization reference magnitude, or a frequency-domain base vector magnitude.

In some other embodiments, the first phase coefficient of the beam includes at least one second phase coefficient.

Optionally, the first phase coefficient is a product of the at least one second phase coefficient.

Optionally, the at least one second phase coefficient includes a wideband phase coefficient and/or a narrowband phase coefficient.

Optionally, the at least one second phase coefficient includes at least one of: a time point reference phase, a polarization reference phase, or a frequency-domain base vector phase.

The beam indicated by the channel state information and the first magnitude coefficient and the first phase coefficient corresponding to the beam described in these embodiments of the present disclosure are similar to those described in the above embodiments, and will not be repeated here.

In the method for reporting information according to embodiments of the present disclosure, the terminal reports the channel state information including the measurement results corresponding to at least two CSI-RSs with different time-domain resources, without need to report the measurement result of each CSI-RS separately, so that the feedback time is shortened, the feedback delay is reduced, and the signaling overhead is reduced.

Figure 5:
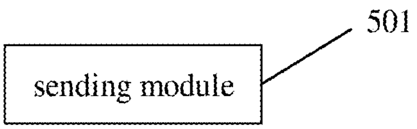
FIG. 5 shows a schematic block diagram of an apparatus for reporting information according to an illustrative embodiment of the present disclosure.

FIG. 5 shows a schematic block diagram of an apparatus for reporting information according to an illustrative embodiment of the present disclosure. Referring to FIG. 5, the apparatus includes a sending module 501.

The sending module 501 is configured to send channel state information to a network device. The channel state information includes measurement results of at least two channel state information reference signals (CSI-RSs), and the at least two CSI-RSs correspond to different time-domain resources.

In some embodiments, the channel state information indicates a beam corresponding to the time-domain resource corresponding to each of the at least two CSI-RSs.

In some embodiments, the beam corresponding to the time-domain resource corresponding to each of the at least two CSI-RSs is indicated by a parameter related to a number of antenna ports and/or a number of oversamplings.

In some embodiments, the channel state information includes a frequency-domain base vector corresponding to the time-domain resource corresponding to each of the at least two CSI-RSs.

In some embodiments, a number of the at least two CSI-RSs is M, and the channel state information indicates a combination identifier of a combination of M CSI-RSs selected from N CSI-RSs, where N is an integer greater than 2, M is an integer greater than 1, and M is less than N.

In some embodiments, the at least two CSI-RSs satisfy at least one of: the at least two CSI-RSs corresponding to different CSI-RS resource sets; the at least two CSI-RSs corresponding to different CSI-RS resource indexes; or the at least two CSI-RSs corresponding to different sending time identifiers of a same CSI-RS index.

In some embodiments, the channel state information further includes a first magnitude coefficient and/or a first phase coefficient of a beam corresponding to each of the at least two CSI-RSs.

In some embodiments, the first magnitude coefficient of the beam includes at least one second magnitude coefficient.

In some embodiments, the first magnitude coefficient is a product of the at least one second magnitude coefficient.

In some embodiments, the at least one second magnitude coefficient includes a wideband magnitude coefficient and/or a narrowband magnitude coefficient.

In some embodiments, the at least one second magnitude coefficient includes at least one of: a time point reference magnitude, a polarization reference magnitude, or a frequency-domain base vector magnitude.

In some embodiments, the first phase coefficient of the beam includes at least one second phase coefficient.

In some embodiments, the first phase coefficient is a product of the at least one second phase coefficient.

In some embodiments, the at least one second phase coefficient includes a wideband phase coefficient and/or a narrowband phase coefficient.

In some embodiments, the at least one second phase coefficient includes at least one of: a time point reference phase, a polarization reference phase, or a frequency-domain base vector phase.

It should be noted that, in implementation of functions, the apparatus according to the above embodiments are illustrated with the above division of the functional modules as examples. In practical applications, the above-mentioned functions may be allocated to different functional modules as needed. That is, the internal structure of the apparatus is divided into different functional modules to complete some or all of the functions described above. In addition, the apparatus according to the above embodiments has the identical conception to the method embodiments, so its specific implementations can refer to the method embodiments, and will not be repeated here.

Figure 6:
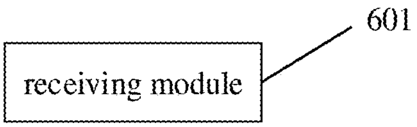
FIG. 6 shows a schematic block diagram of an apparatus for receiving information according to an illustrative embodiment of the present disclosure.

FIG. 6 shows a schematic block diagram of an apparatus for receiving information according to an illustrative embodiment of the present disclosure. Referring to FIG. 6, the apparatus includes a receiving module 601.

The receiving module 601 is configured to receive channel state information sent by a terminal. The channel state information includes measurement results of at least two channel state information reference signals (CSI-RSs), and the at least two CSI-RSs correspond to different time-domain resources.

In some embodiments, the channel state information indicates a beam corresponding to the time-domain resource corresponding to each of the at least two CSI-RSs.

In some embodiments, the beam corresponding to the time-domain resource corresponding to each of the at least two CSI-RSs is indicated by a parameter related to a number of antenna ports and/or a number of oversamplings.

In some embodiments, the channel state information includes a frequency-domain base vector corresponding to the time-domain resource corresponding to each of the at least two CSI-RSs.

In some embodiments, a number of the at least two CSI-RSs is M, and the channel state information indicates a combination identifier of a combination of M CSI-RSs selected from the N CSI-RSs, where N is an integer greater than 2, M is an integer greater than 1, and M is less than N.

In some embodiments, the at least two CSI-RSs satisfy at least one of: the at least two CSI-RSs corresponding to different CSI-RS resource sets; the at least two CSI-RSs corresponding to different CSI-RS resource indexes; or the at least two CSI-RSs corresponding to different sending time identifiers of a same CSI-RS index.

In some embodiments, the channel state information further includes a first magnitude coefficient and/or a first phase coefficient of a beam corresponding to each of the at least two CSI-RSs.

In some embodiments, the first magnitude coefficient of the beam includes at least one second magnitude coefficient.

In some embodiments, the first magnitude coefficient is a product of the at least one second magnitude coefficient.

In some embodiments, the at least one second magnitude coefficient includes a wideband magnitude coefficient and/or a narrowband magnitude coefficient.

In some embodiments, the at least one second magnitude coefficient includes at least one of: a time point reference magnitude, a polarization reference magnitude, or a frequency-domain base vector magnitude.

In some embodiments, the first phase coefficient of the beam includes at least one second phase coefficient.

In some embodiments, the first phase coefficient is a product of the at least one second phase coefficient.

In some embodiments, the at least one second phase coefficient includes a wideband phase coefficient and/or a narrowband phase coefficient.

In some embodiments, the at least one second phase coefficient includes at least one of: a time point reference phase, a polarization reference phase, or a frequency-domain base vector phase.

It should be noted that, in implementation of functions, the apparatus according to the above embodiments are illustrated with reference to the above division of the functional modules as examples. In practical applications, the above-mentioned functions may be allocated to different functional modules as needed. That is, the internal structure of the apparatus is divided into different functional modules to complete some or all of the functions described above. In addition, the apparatus according to the above embodiments has the identical conception to the method embodiments, so its specific implementations can refer to the method embodiments, and will not be repeated here.

Figure 7:
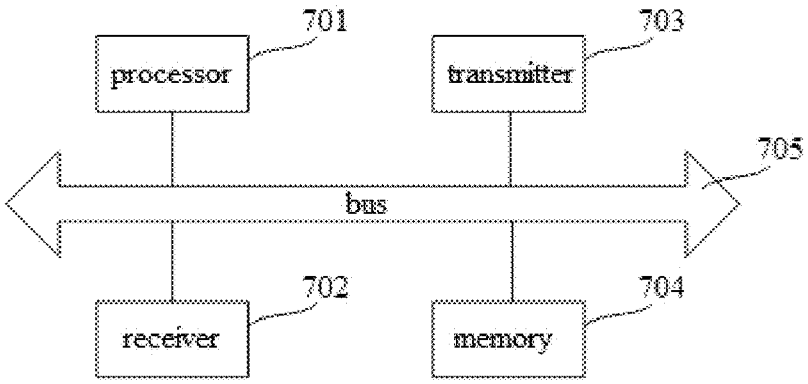
FIG. 7 shows a schematic block diagram of a communication device according to an illustrative embodiment of the present disclosure.

FIG. 7 shows a schematic block diagram of a communication device according to an illustrative embodiment of the present disclosure, the communication device includes: a processor 701, a receiver 702, a transmitter 703, a memory 704 and a bus 705.

The processor 701 includes one or more processing cores, and the processor 701 executes various functional applications and information processing by running software programs and modules.

The receiver 702 and the transmitter 703 may be implemented as a communication component, and the communication component may be a communication chip.

The memory 704 is connected to the processor 701 via the bus 705.

The memory 704 may be used to store at least one program code, and the processor 701 is used to execute the at least one program code to implement various steps in the above method embodiments.

In addition, the communication device may be a terminal or a network device. The memory 704 may be implemented using any type of volatile or non-volatile memory devices, or a combination thereof, including but not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM) (PROM).

In illustrative embodiments, there is also provided a computer-readable storage medium having stored therein executable program codes that, when loaded and executed by a processor, cause the method for reporting information that is performed by a communication device as described in the above various method embodiments to be implemented.

In illustrative embodiments, there is provided a chip. The chip includes a programmable logic circuit and/or program instructions. The chip, when run on a terminal or a network device, causes the method for reporting information as described in the above various method embodiments to be implemented.

In illustrative embodiments, there is provided a computer program product that, when executed by a processor of a terminal or a network device, causes the method for reporting information as described in the above various method embodiments to be implemented.

It can be understood by those of ordinary skill in the art that some or all of the steps in the above embodiments may be implemented by hardware, or may be implemented by related hardware instructed by a program. The program may be stored in a computer-readable storage medium. The above-mentioned storage medium may be a read-only memory, a magnetic disk, an optical disk, or the like.

The above are only optional embodiments of the present disclosure, and are not intended to limit the present disclosure. Any modifications, equivalent replacements, or improvements made within the spirit and principles of the present disclosure shall be included in the protection scope of the present disclosure.

What is claimed is:

1. A method for reporting information, performed by a terminal, comprising:

sending channel state information to a network device, wherein the channel state information comprises measurement results of at least two channel state information reference signals (CSI-RSs), and the at least two CSI-RSs correspond to different time-domain resources;

wherein a number of the at least two CSI-RSs is M, and the channel state information indicates a combination identifier of a combination of M CSI-RSs selected from N CSI-RSs, where N is an integer greater than 2, M is an integer greater than 1, and M is less than N.

2. The method according to claim 1, wherein the channel state information indicates a beam corresponding to the time-domain resource corresponding to each of the at least two CSI-RSs.

3. The method according to claim 2, wherein the beam corresponding to the time-domain resource corresponding to each of the at least two CSI-RSs is indicated by a parameter related to at least one of a number of antenna ports or a number of oversamplings.

4. The method according to claim 2, wherein the channel state information further comprises at least one of a first magnitude coefficient or a first phase coefficient of a beam corresponding to each of the at least two CSI-RSs.

5. The method according to claim 4, wherein the first magnitude coefficient of the beam comprises at least one second magnitude coefficient.

6. The method according to claim 5, wherein the first magnitude coefficient is a product of the at least one second magnitude coefficient.

7. The method according to claim 6, wherein the at least one second magnitude coefficient comprises at least one of: a time point reference magnitude, a polarization reference magnitude, or a frequency-domain base vector magnitude.

8. The method according to claim 5, wherein the at least one second magnitude coefficient comprises at least one of a wideband magnitude coefficient or a narrowband magnitude coefficient.

9. The method according to claim 4, wherein the first phase coefficient of the beam comprises at least one second phase coefficient.

10. The method according to claim 9, wherein the first phase coefficient is a product of the at least one second phase coefficient.

11. The method according to claim 9, wherein the at least one second phase coefficient comprises at least one of a wideband phase coefficient or a narrowband phase coefficient.

12. The method according to claim 11, wherein the at least one second phase coefficient comprises at least one of: a time point reference phase, a polarization reference phase, or a frequency-domain base vector phase.

13. The method according to claim 1, wherein the channel state information comprises a frequency-domain base vector corresponding to the time-domain resource corresponding to each of the at least two CSI-RSs.

14. The method according to claim 1, wherein the at least two CSI-RSs satisfy at least one of:

the at least two CSI-RSs corresponding to different CSI-RS resource sets;

the at least two CSI-RSs corresponding to different CSI-RS resource indexes; or the at least two CSI-RSs corresponding to different sending time identifiers of a same CSI-RS index.

15. A method for receiving information, performed by a network device, comprising:

receiving channel state information sent by a terminal, wherein the channel state information comprises measurement results of at least two channel state information reference signals (CSI-RSs), and the at least two CSI-RSs correspond to different time-domain resources;

wherein a number of the at least two CSI-RSs is M, and the channel state information indicates a combination identifier of a combination of M CSI-RSs selected from N CSI-RSs, where N is an integer greater than 2, M is an integer greater than 1, and M is less than N.

16. A terminal, comprising:

a processor; and a transceiver, connected to the processor, wherein the processor is configured to:

send channel state information to a network device, wherein the channel state information comprises measurement results of at least two channel state information reference signals (CSI-RSs), and the at least two CSI-RSs correspond to different time-domain resources;

wherein a number of the at least two CSI-RSs is M, and the channel state information indicates a combination identifier of a combination of M CSI-RSs selected from N CSI-RSs, where N is an integer greater than 2, M is an integer greater than 1, and M is less than N.

17. A network device, comprising:

a processor; and a transceiver, connected to the processor, wherein the processor is configured to perform the method for receiving information according to claim 15.

18. A non-transitory computer-readable storage medium, having stored therein executable program codes that, when loaded and executed by a processor, cause the method for reporting information according to claim 1 to be implemented.

19. A non-transitory computer-readable storage medium, having stored therein executable program codes that, when loaded and executed by a processor, cause the method according to claim 15 to be implemented.

* * * * *